US008843378B2

(12) United States Patent
Herre et al.

(10) Patent No.: US 8,843,378 B2
(45) **Date of Patent: *Sep. 23, 2014**

(54) MULTI-CHANNEL SYNTHESIZER AND METHOD FOR GENERATING A MULTI-CHANNEL OUTPUT SIGNAL

(75) Inventors: Juergen Herre, Buckenhof (DE); Sascha Disch, Fuerth (DE); Johannes Hilpert, Nuremberg (DE); Christian Ertel, Unterlindelbach (DE); Andreas Hoelzer, Erlangen (DE); Claus-Christian Spenger, Nürnberg (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 2242 days.

This patent is subject to a terminal disclaimer.

(21) Appl. No.: 10/883,538

(22) Filed: Jun. 30, 2004

(65) Prior Publication Data

US 2006/0004583 A1 Jan. 5, 2006

(51) Int. Cl.

*G06F 15/00* (2006.01)
*G10L 19/00* (2013.01)
*G10L 21/00* (2013.01)
*H04H 40/54* (2008.01)
*H04R 5/00* (2006.01)
*H04S 3/00* (2006.01)
*G10L 19/008* (2013.01)

(52) U.S. Cl.

CPC ............... *H04S 3/008* (2013.01); *G10L 19/008* (2013.01); *H04S 2420/03* (2013.01)
USPC ........... 704/500; 704/200; 704/201; 704/501; 381/12; 381/22; 381/23

(58) Field of Classification Search

USPC .............................................. 704/200.1, 500
See application file for complete search history.

(56) References Cited

U.S. PATENT DOCUMENTS 5,307,441 A 4/1994 Tzeng et al.
5,675,701 A 10/1997 Kleijn et al.
5,956,674 A * 9/1999 Smyth et al. ............... 704/200.1

(Continued)

OTHER PUBLICATIONS

Faller et al, "Binaural Cue Coding Applied to Stereo and Multi-channel Audio Compression" May 2002, AES, p. 1-9.*

(Continued)

*Primary Examiner* — Richemond Dorvil
*Assistant Examiner* — Olujimi Adesanya
(74) *Attorney, Agent, or Firm* — Michael A. Glenn; Perkins Coie LLP

(57) ABSTRACT

A multi-channel synthesizer includes a post processor for determining post processed reconstruction parameters or quantities derived from the reconstruction parameter for an actual time portion of the input signal so that the post processed reconstruction parameter or the post processed quantity is different from the corresponding quantized and inversely quantized reconstruction parameter in that the value of the post processed reconstruction parameter or the derived quantity is not bound by the quantization step size. A multi-channel reconstructor uses the post-processed reconstruction parameter for reconstructing the multi-channel output signal. By post processing reconstruction parameters in connection with multi-channel encoding/decoding allows a low data rate on the one hand and a high quality on the other hand, since strong changes in the reconstructed multi-channel output signal because of a large quantization step size for the reconstruction parameter, which is preferable because of low bit rate requirements, are reduced.

23 Claims, 11 Drawing Sheets

(56) References Cited

U.S. PATENT DOCUMENTS

| | | | | |
|---|---|---|---|---|
| 6,009,388 | A * | 12/1999 | Ozawa | 704/223 |
| 6,130,949 | A * | 10/2000 | Aoki et al. | 381/94.3 |
| 6,233,550 | B1 * | 5/2001 | Gersho et al. | 704/208 |
| 6,307,941 | B1 * | 10/2001 | Tanner et al. | 381/17 |
| 6,341,165 | B1 * | 1/2002 | Gbur et al. | 381/23 |
| 6,611,797 | B1 | 8/2003 | Amada et al. | |
| 6,763,115 | B1 | 7/2004 | Kobayashi | |
| 7,024,354 | B2 * | 4/2006 | Ozawa | 704/219 |
| 7,181,019 | B2 * | 2/2007 | Breebaart et al. | 381/23 |
| 7,394,903 | B2 * | 7/2008 | Herre et al. | 381/23 |
| 7,447,317 | B2 * | 11/2008 | Herre et al. | 381/23 |
| 2003/0035553 | A1 * | 2/2003 | Baumgarte et al. | 381/94.2 |
| 2003/0220801 | A1 * | 11/2003 | Spurrier | 704/503 |
| 2004/0044527 | A1 * | 3/2004 | Thumpudi et al. | 704/230 |

OTHER PUBLICATIONS

Faller et al, "Estimation of Auditory Spatial cues for Binaural Cue Coding" ,2002,IEEE, p. 1801-1804.*

Baumgarte, et al. Binaural Cue Coding—Part I: Psychoacoustic Fundamentals and Design Principles. IEEE Transactions on Speech and Audio Processing, vol. 11, No. 6, Nov. 2003.

Faller, C. Coding of Spatial Audio Compatible with Different Playback Formats. Audio Engineering Society 117$^{th}$ Convention. Oct. 28-31, 2004. San Francisco, CA.

Faller, C., et al. Binaural Cue Coding—Part II: Schemes and Applications. IEEE Transactions on Speech and Audio Processing, vol. 11, No. 6. Nov. 2003.

Herre, J., et al. MP3 Surround: Efficient and Compatible Coding of Multi-Channel Audio. Audio Engineering Society 116$^{th}$ Convention. May 8-11, 2004. Berlin, Germany.

Schuijers, E., et al. Low Complexity Parametric Stereo Coding. Audio Engineering Society 116$^{th}$ Convention. May 8-11, 2004. Berlin, Germany.

Herre et al. "Intensity Stereo Coding", Audio Engineering Society Rerprint, Feb. 3, 2001, New York, USA.

Fuchs, H.,"Improving Joint Stereo Audio Coding by Adaptive Inter-Channel Prediction", Institut fur Theoretische Nachrichtentechnik and Informationsverarbeitung, Universitat Hannover, Germany.

Faller and Baumgarte, "Efficient Representation of Spatial Audio Using Perceptual Parametrization", Oct. 2001, New Paltz, New York, USA.

Faller and Baumgarte, "Estimation of Auditory Spatial Cues for Binary Cue Coding", 2002, Media Signal Processing Research, Agere Systems, Murray Hit, N.J. USA.

Faller and Baumgarte, "Binary Cue Coding: A Novel and Efficient Representation of Spatial Audio", 2002, Media Signal Processing Research, Agere Systems, Murray Hill, N.J., USA.

Faller and Baumgarte, "Why Binary Cue Coding is better than Intensity Stereo Coding", Audio Engineering Society Convention Paper 5575, May 2002, Munich, Germany.

Faller and Baumgarte, "Binary Cue Coding Applied to Stereo and Mutli-Channel Audio Compression", Audio Engineering Society Convention Paper 5574, May 2002 Munich, Germany.

Faller and Baumgarte, "Design and Evaluation of Binaural Cue Coding Schenes", Audio Engineering Society Convention Paper 5706, Oct. 2002 Los Angeles, USA.

Faller and Baumgarte, "Binaural Cue Coding Applied to Audio Compression with Flexible Rendering", Audio Engineering Society Convention Paper 5686, Oct. 2002 Los Angeles, USA.

Breebaart, et al. "High-quality parametric spatial audio coding at low bitrates", Audio Engineering Society Convention Paper 6072, May 2004, Berlin, Germany.

Schuijers et al., "Low complexity parametric stereo coding", Audio Engineering Society Convention Paper 6073, May 2004, Berlin, Germany.

* cited by examiner

- Straight-forward inverse quantizer maps integer quantizer levels to quantized values (e.g. 0, 10, 20, . . . ) only

- enhanced inverse quantizer maps non-integer (post-processed) quantizer "levels" to "inverse quantized values" between values determined by the (inverse) QUANTIZER RULE (e.g. 5, 15, 25, . . . )

MULTI-CHANNEL SYNTHESIZER AND METHOD FOR GENERATING A MULTI-CHANNEL OUTPUT SIGNAL

FIELD OF THE INVENTION

The present invention relates to multi-channel audio processing and, in particular, to multi-channel audio reconstruction using a base channel and parametric side information for reconstructing an output signal having a plurality of channels.

BACKGROUND OF THE INVENTION AND PRIOR ART

In recent times, the multi-channel audio reproduction technique is becoming more and more important. This may be due to the fact that audio compression/encoding techniques such as the well-known mp3 technique have made it possible to distribute audio records via the Internet or other transmission channels having a limited bandwidth. The mp3 coding technique has become so famous because of the fact that it allows distribution of all the records in a stereo format, i.e., a digital representation of the audio record including a first or left stereo channel and a second or right stereo channel.

Nevertheless, there are basic shortcomings of conventional two-channel sound systems. Therefore, the surround technique has been developed. A recommended multi-channel-surround representation includes, in addition to the two stereo channels L and R, an additional center channel C and two surround channels Ls, Rs. This reference sound format is also referred to as three/two-stereo, which means three front channels and two surround channels. Generally, five transmission channels are required. In a playback environment, at least five speakers at the respective five different places are needed to get an optimum sweet spot in a certain distance from the five well-placed loudspeakers.

Several techniques are known in the art for reducing the amount of data required for transmission of a multi-channel audio signal. Such techniques are called joint stereo techniques. To this end, reference is made to FIG. 10, which shows a joint stereo device 60. This device can be a device implementing e.g. intensity stereo (IS) or binaural cue coding (BCC) Such a device generally receives—as an input—at least two channels (CH1, CH2, . . . CHn), and outputs a single carrier channel and parametric data. The parametric data are defined such that, in a decoder, an approximation of an original channel (CH1, CH2, . . . CHn) can be calculated.

Normally, the carrier channel will include subband samples, spectral coefficients, time domain samples etc, which provide a comparatively fine representation of the underlying signal, while the parametric data do not include such samples of spectral coefficients but include control parameters for controlling a certain reconstruction algorithm such as weighting by multiplication, time shifting, frequency shifting, phase shifting, . . . The parametric data, therefore, include only a comparatively coarse representation of the signal or the associated channel. Stated in numbers, the amount of data required by a carrier channel will be in the range of 60-70 kbit/s, while the amount of data required by parametric side information for one channel will be in the range of 1,5-2,5 kbit/s. An example for parametric data are the well-known scale factors, intensity stereo information or binaural cue parameters as will be described below.

Intensity stereo coding is described in AES preprint 3799, "Intensity Stereo Coding", J. Herre, K. H. Brandenburg, D. Lederer, February 1994, Amsterdam. Generally, the concept of intensity stereo is based on a main axis transform to be applied to the data of both stereophonic audio channels. If most of the data points are concentrated around the first principle axis, a coding gain can be achieved by rotating both signals by a certain angle prior to coding. This is, however, not always true for real stereophonic production techniques. Therefore, this technique is modified by excluding the second orthogonal component from transmission in the bit stream. Thus, the reconstructed signals for the left and right channels consist of differently weighted or scaled versions of the same transmitted signal. Nevertheless, the reconstructed signals differ in their amplitude but are identical regarding their phase information. The energy-time envelopes of both original audio channels, however, are preserved by means of the selective scaling operation, which typically operates in a frequency selective manner. This conforms to the human perception of sound at high frequencies, where the dominant spatial cues are determined by the energy envelopes.

Additionally, in practical implementations, the transmitted signal, i.e. the carrier channel is generated from the sum signal of the left channel and the right channel instead of rotating both components. Furthermore, this processing, i.e., generating intensity stereo parameters for performing the scaling operation, is performed frequency selective, i.e., independently for each scale factor band, i.e., encoder frequency partition. Preferably, both channels are combined to form a combined or "carrier" channel, and, in addition to the combined channel, the intensity stereo information is determined which depend on the energy of the first channel, the energy of the second channel or the energy of the combined or channel.

The BCC technique is described in AES convention paper 5574, "Binaural cue coding applied to stereo and multi-channel audio compression", C. Faller, F. Baumgarte, May 2002, Munich. In BCC encoding, a number of audio input channels are converted to a spectral representation using a DFT based transform with overlapping windows. The resulting uniform spectrum is divided into non-overlapping partitions each having an index. Each partition has a bandwidth proportional to the equivalent rectangular bandwidth (ERB). The inter-channel level differences (ICLD) and the inter-channel time differences (ICTD) are estimated for each partition for each frame k. The ICLD and ICTD are quantized and coded resulting in a BCC bit stream. The inter-channel level differences and inter-channel time differences are given for each channel relative to a reference channel. Then, the parameters are calculated in accordance with prescribed formulae, which depend on the certain partitions of the signal to be processed.

At a decoder-side, the decoder receives a mono signal and the BCC bit stream. The mono signal is transformed into the frequency domain and input into a spatial synthesis block, which also receives decoded ICLD and ICTD values. In the spatial synthesis block, the BCC parameters (ICLD and ICTD) values are used to perform a weighting operation of the mono signal in order to synthesize the multi-channel signals, which, after a frequency/time conversion, represent a reconstruction of the original multi-channel audio signal.

In case of BCC, the joint stereo module 60 is operative to output the channel side information such that the parametric channel data are quantized and encoded ICLD or ICTD parameters, wherein one of the original channels is used as the reference channel for coding the channel side information.

Normally, the carrier channel is formed of the sum of the participating original channels.

Naturally, the above techniques only provide a mono representation for a decoder, which can only process the carrier channel, but is not able to process the parametric data for generating one or more approximations of more than one input channel.

The audio coding technique known as binaural cue coding (BCC) is also well described in the United States patent application publications U.S. 2003, 0219130 A1, 2003/0026441 A1 and 2003/0035553 A1. Additional reference is also made to "Binaural Cue Coding. Part II: Schemes and Applications", C. Faller and F. Baumgarte, IEEE Trans. On Audio and Speech Proc., Vol. 11, No. 6, November 1993. The cited United States patent application publications and the two cited technical publications on the BCC technique authored by Faller and Baumgarte are incorporated herein by reference in their entireties.

In the following, a typical generic BCC scheme for multi-channel audio coding is elaborated in more detail with reference to FIGS. 11 to 13. FIG. 11 shows such a generic binaural cue coding scheme for coding/transmission of multi-channel audio signals. The multi-channel audio input signal at an input 110 of a BCC encoder 112 is down mixed in a down mix block 114. In the present example, the original multi-channel signal at the input 110 is a 5-channel surround signal having a front left channel, a front right channel, a left surround channel, a right surround channel and a center channel. In a preferred embodiment of the present invention, the down mix block 114 produces a sum signal by a simple addition of these five channels into a mono signal. Other down mixing schemes are known in the art such that, using a multi-channel input signal, a down mix signal having a single channel can be obtained. This single channel is output at a sum signal line 115. A side information obtained by a BCC analysis block 116 is output at a side information line 117. In the BCC analysis block, inter-channel level differences (ICLD), and inter-channel time differences (ICTD) are calculated as has been outlined above. Recently, the BCC analysis block 116 has been enhanced to also calculate inter-channel correlation values (ICC values). The sum signal and the side information is transmitted, preferably in a quantized and encoded form, to a BCC decoder 120. The BCC decoder decomposes the transmitted sum signal into a number of subbands and applies scaling, delays and other processing to generate the subbands of the output multi-channel audio signals. This processing is performed such that ICLD, ICED and ICC parameters (cues) of a reconstructed multi-channel signal at an output 121 are similar to the respective cues for the original multi-channel signal at the input 110 into the BCC encoder 112. To this end, the BCC decoder 120 includes a BCC synthesis block 122 and a side information processing block 123.

In the following, the internal construction of the BCC synthesis block 122 is explained with reference to FIG. 12. The sum signal on line 115 is input into a time/frequency conversion unit or filter bank FB 125. At the output of block 125, there exists a number N of sub band signals or, in an extreme case, a block of a spectral coefficients, when the audio filter bank 125 performs a 1:1 transform, i.e., a transform which produces N spectral coefficients from N time domain samples.

The BCC synthesis block 122 further comprises a delay stage 126, a level modification stage 127, a correlation processing stage 128 and an inverse filter bank stage IFB 129. At the output of stage 129, the reconstructed multi-channel audio signal having for example five channels in case of a 5-channel surround system, can be output to a set of loudspeakers 124 as illustrated in FIG. 11.

As shown in FIG. 12, the input signal s(n) is converted into the frequency domain or filter bank domain by means of element 125. The signal output by element 125 is multiplied such that several versions of the same signal are obtained as illustrated by multiplication node 130. The number of versions of the original signal is equal to the number of output channels in the output signal to be reconstructed When, in general, each version of the original signal at node 130 is subjected to a certain delay $d_1, d_2, \ldots, d_i, \ldots, d_N$. The delay parameters are computed by the side information processing block 123 in FIG. 11 and are derived from the inter-channel time differences as determined by the BCC analysis block 116.

The same is true for the multiplication parameters $a_1, a_2, \ldots, a_i, \ldots, a_N$, which are also calculated by the side information processing block 123 based on the inter-channel level differences as calculated by the BCC analysis block 116.

The ICC parameters calculated by the BCC analysis block 116 are used for controlling the functionality of block 128 such that certain correlations between the delayed and level-manipulated signals are obtained at the outputs of block 128. It is to be noted here that the ordering of the stages 126, 127, 128 may be different from the case shown in FIG. 12.

It is to be noted here that, in a frame-wise processing of an audio signal, the BCC analysis is performed frame-wise, i.e. time-varying, and also frequency-wise. This means that, for each spectral band, the BCC parameters are obtained. This means that, in case the audio filter bank 125 decomposes the input signal into for example 32 band pass signals, the BCC analysis block obtains a set of BCC parameters for each of the 32 bands. Naturally the BCC synthesis block 122 from FIG. 11, which is shown in detail in FIG. 12, performs a reconstruction which is also based on the 32 bands in the example.

In the following, reference is made to FIG. 13 showing a setup to determine certain BCC parameters. Normally, ICLD, ICTD and ICC parameters can be defined between pairs of channels. However, it is preferred to determine ICLD and ICTD parameters between a reference channel and each other channel. This is illustrated in FIG. 13A.

ICC parameters can be defined in different ways. Most generally, one could estimate ICC parameters in the encoder between all possible channel pairs as indicated in FIG. 13B. In this case, a decoder would synthesize ICC such that it is approximately the same as in the original multi-channel signal between all possible channel pairs. It was, however, proposed to estimate only ICC parameters between the strongest two channels at each time. This scheme is illustrated in FIG. 13C, where an example is shown, in which at one time instance, an ICC parameter is estimated between channels 1 and 2, and, at another time instance, an ICC parameter is calculated between channels 1 and 5. The decoder then synthesizes the inter-channel correlation between the strongest channels in the decoder and applies some heuristic rule for computing and synthesizing the inter-channel coherence for the remaining channel pairs.

Regarding the calculation of, for example, the multiplication parameters $a_1$, $a_N$ based on transmitted ICLD parameters, reference is made to AES convention paper 5574 cited above. The ICLD parameters represent an energy distribution in an original multi-channel signal. Without loss of generality, it is shown in FIG. 13A that there are four ICLD parameters showing the energy difference between all other channels and the front left channel. In the side information processing block 123, the multiplication parameters $a_1, \ldots, a_N$ are derived from the ICLD parameters such that the total energy of all reconstructed output channels is the same as (or proportional to) the energy of the transmitted sum signal. A simple way for determining these parameters is a 2-stage process, in which, in a first stage, the multiplication factor for the left front channel is set to unity, while multiplication factors for the other channels in FIG. 13A are set to the transmitted ICLD values. Then, in a second stage, the energy of all five channels is calculated and compared to the energy of the transmitted sum signal. Then, all channels are downscaled using a downscaling factor which is equal for all channels, wherein the downscaling factor is selected such that the total energy of all reconstructed output channels is, after downscaling, equal to the total energy of the transmitted sum signal.

Naturally, there are other methods for calculating the multiplication factors, which do not rely on the 2-stage process but which only need a 1-stage process.

Regarding the delay parameters, it is to be noted that the delay parameters ICTD, which are transmitted from a BCC encoder can be used directly, when the delay parameter $d_1$ for the left front channel is set to zero. No resealing has to be done here, since a delay does not alter the energy of the signal.

Regarding the inter-channel coherence measure ICC transmitted from the BCC encoder to the BCC decoder, it is to be noted here that a coherence manipulation can be done by modifying the multiplication factors $a_1, \ldots, a_n$ such as by multiplying the weighting factors of all subbands with random numbers with values between 20log10(−6) and 20log10 (6). The pseudo-random sequence is preferably chosen such that the variance is approximately constant for all critical bands, and the average is zero within each critical band. The same sequence is applied to the spectral coefficients for each different frame. Thus, the auditory image width is controlled by modifying the variance of the pseudo-random sequence. A larger variance creates a larger image width. The variance modification can be performed in individual bands that are critical-band wide. This enables the simultaneous existence of multiple objects in an auditory scene, each object having a different image width. A suitable amplitude distribution for the pseudo-random sequence is a uniform distribution on a logarithmic scale as it is outlined in the US patent application publication 2003/0219130 A1. Nevertheless, all BCC synthesis processing is related to a single input channel transmitted as the sum signal from the BCC encoder to the BCC decoder as shown in FIG. 11.

A related technique, also known as parametric stereo, is described in J. Breebaart, S. van de Par, A. Kohlrausch, E. Schuijers, "High-Quality Parametric Spatial Audio Coding at Low Bitrates", AES 116$^{th}$ Convention, Berlin, Preprint 6072, May 2004, and E. Schuijers, J. Breebaart, H. Purnhagen, J. Engdegard, "Low Complexity Parametric Stereo Coding", AES 116$^{th}$ Convention, Berlin, Preprint 6073, May 2004.

As has been outlined above with respect to FIG. 13, the parametric side information, i.e., the interchannel level differences (ICLD), the interchannel time differences (ICTD) or the interchannel coherence parameter (ICC) can be calculated and transmitted for each of the five channels. This means that one, normally, transmits five sets of inter-channel level differences for a five channel signal. The same is true for the interchannel time differences. With respect to the interchannel coherence parameter, it can also be sufficient to only transmit for example two sets of these parameters.

As has been outlined above with respect to FIG. 12, there is not a single level difference parameter, time difference parameter or coherence parameter for one frame or time portion of a signal. Instead, these parameters are determined for several different frequency bands so that a frequency-dependent parametrization is obtained. Since it is preferred to use for example 32 frequency channels, i.e., a filter bank having 32 frequency bands for BCC analysis and BCC synthesis, the parameters can occupy quite a lot of data. Although—compared to other multi-channel transmissions—the parametric representation results in a quite low data rate, there is a continuing need for further reduction of the necessary data rate for representing a multi-channel signal such as a signal having two channels (stereo signal) or a signal having more than two channels such as a multi-channel surround signal.

To this end, the encoder-side calculated reconstruction parameters are quantized in accordance with a certain quantization rule. This means that unquantized reconstruction parameters are mapped onto a limited set of quantization levels or quantization indices as it is known in the art and described in detail in C. Faller and F. Baumgarte, "Binaural cue coding applied to audio compression with flexible rendering," AES 113$^{th}$ Convention, Los Angeles, Preprint 5686, October 2002.

Quantization has the effect that all parameter values, which are smaller than the quantization step size, are quantized to zero. Additionally, by mapping a large set of unquantized values to a small set of quantized values results in data saving per se. These data rate savings are further enhanced by entropy-encoding the quantized reconstruction parameters on the encoder-side. Preferred entropy-encoding methods are Huffman methods based on predefined code tables or based on an actual determination of signal statistics and signal-adaptive construction of codebooks. Alternatively, other entropy-encoding tools can be used such as arithmetic encoding.

Generally, one has the rule that the data rate required for the reconstruction parameters decreases with increasing quantizer step size. Stated in other words, a coarser quantization results in a lower data rate, and a finer quantization results in a higher data rate.

Since parametric signal representations are normally required for low data rate environments, one tries to quantize the reconstruction parameters as coarse as possible to obtain a signal representation having a certain amount of data in the base channel, and also having a reasonable small amount of data for the side information which include the quantized and entropy-encoded reconstruction parameters.

Prior art methods, therefore, derive the reconstruction parameters to be transmitted directly from the multi-channel signal to be encoded. A coarse quantization as discussed above results in reconstruction parameter distortions, which result in large rounding errors, when the quantized reconstruction parameter is inversely quantized in a decoder and used for multi-channel synthesis. Naturally, the rounding error increases with the quantizer step size, i.e., with the selected "quantizer coarseness". Such rounding errors may result in a quantization level change, i.e., in a change from a first quantization level at a first time instant to a second quantization level at a later time instant, wherein the difference between one quantizer level and another quantizer level is defined by the quite large quantizer step size, which is preferable for a coarse quantization. Unfortunately, such a quantizer level change amounting to the large quantizer step size can be triggered by only a small parameter change, when the unquantized parameter is in the middle between two quantization levels. It is clear that the occurrence of such quantizer index changes in the side information results in the same strong changes in the signal synthesis stage. When—as an example—the interchannel level difference is considered, it becomes clear that a strong change results in a sharp decrease of loudness of a certain loudspeaker signal and an accompanying sharp increase of the loudness of a signal for another loudspeaker. This situation, which is only triggered by a quantization level change and a coarse quantization can be perceived as an immediate relocation of a sound source from a (virtual) first place to a (virtual) second place. Such an immediate relocation from one time instant to another time instant sounds unnatural, i.e., is perceived as a modulation effect, since sound sources of, in particular, tonal signals do not change their location very fast.

Generally, also transmission errors may result in sharp changes of quantizer indices, which immediately result in the sharp changes in the multi-channel output signal, which is even more true for situations, in which a coarse quantizer for data rate reasons has been adopted.

SUMMARY OF THE INVENTION

It is the object of the present invention to provide an improved signal synthesis concept allowing a low data rate on the one hand and a good subjective quality on the other hand.

In accordance with the first aspect of the present invention, this object is achieved by a multi-channel synthesizer for generating an output signal from an input signal, the input signal having at least one input channel and a sequence of quantized reconstruction parameters, the quantized reconstruction parameters being quantized in accordance with a quantization rule, and being associated with subsequent time portions of the input channel, the output signal having a number of synthesized output channels, and the number of synthesized output channels being greater than 1 or greater than a number of input channels, comprising: a post processor for determining a post processed reconstruction parameter or a post processed quantity derived from the reconstruction parameter for a time portion of the input signal to be processed, wherein the post processor is operative to determine the post processed reconstruction parameter such that a value of the post processed reconstruction parameter or the post processed quantity is different from a value obtainable using requantization in accordance with the quantization rule; and a multi-channel reconstructor for reconstructing a time portion of the number of synthesized output channels using the time portion of the input channel and the post processed reconstruction parameter or the post processed quantity.

In accordance with a second aspect of the invention, this object is achieved by a method of generating an output signal from an input signal, the input signal having at least one input channel and a sequence of quantized reconstruction parameters, the quantized reconstruction parameters being quantized in accordance with a quantization rule, and being associated with subsequent time portions of the input channel, the output signal having a number of synthesized output channels, and the number of synthesized output channels being greater than 1 or greater than a number of input channels, comprising determining a post processed reconstruction parameter or a post processed quantity derived from the reconstruction parameter for a time portion of the input signal to be processed, such that a value of the post processed reconstruction parameter or the post processed quantity is different from a value obtainable using requantization in accordance with the quantization rule; and reconstructing a time portion of the number of synthesized output channels using the time portion of the input channel and the post processed reconstruction parameter or the post processed quantity.

In accordance with a third aspect of the present invention, this object is achieved by a computer program implementing the above method, when running on a computer.

The present invention is based on the finding that a post processing for quantized reconstruction parameters used in a multi-channel synthesizer is operative to reduce or even eliminate problems associated with coarse quantization on the one hand and quantization level changes on the other hand. While, in prior art systems, a small parameter change in an encoder results in a strong parameter change at the decoder, since a requantization in the synthesizer is only admissible for the limited set of quantized values, the inventive device performs a post processing of reconstruction parameters so that the post processed reconstruction parameter for a time portion to be processed of the input signal is not determined by the encoder-adopted quantization raster, but results in a value of the reconstruction parameter, which is different from a value obtainable by the quantization in accordance with the quantization rule.

While, in a linear quantizer case, the prior art method only allows inversely quantized values being integer multiples of the quantizer step size, the inventive post processing allows inversely quantized values to be non-integer multiples of the quantizer step size. This means that the inventive post processing eliminates the quantizer step size limitation, since also post processed reconstruction parameters lying between two adjacent quantizer levels can be obtained by post processing and used by the inventive multi-channel reconstructor, which makes use of the post processed reconstruction parameter.

This post processing can be performed before or after requantization in a multi-channel synthesizer. When the post processing is performed with the quantized parameters, i.e., with the quantizer indices, an inverse quantizer is needed, which can inversely quantize not only quantizer step multiples, but which can also inversely quantize to inversely quantized values between multiples of the quantizer step size.

In case the post processing is performed using inversely quantized reconstruction parameters, a straight-forward inverse quantizer can be used, and an interpolation/filtering/smoothing is performed with the inversely quantized values.

In case of a non-linear quantization rule, such as a logarithmic quantization rule, a post processing of the quantized reconstruction parameters before requantization is preferred, since the logarithmic quantization is similar to the human ear's perception of sound, which is more accurate for low-level sound and less accurate for high-level sound, i.e., makes a kind of a logarithmic compression.

It is to be noted here that the inventive merits are not only obtained by modifying the reconstruction parameter itself which is included in the bit stream as the quantized parameter. The advantages can also be obtained by deriving a post processed quantity from the reconstruction parameter. This is especially useful, when the reconstruction parameter is a difference parameter and a manipulation such as smoothing is performed on an absolute parameter derived from the difference parameter.

In a preferred embodiment of the present invention, the post processing for the reconstruction parameters is controlled by means of a signal analyser, which analyses the signal portion associated with a reconstruction parameter to find out, which signal characteristic is present. In a preferred embodiment, the inventive post processing is activated only for tonal portions of the signal (with respect to frequency and/or time), while the post processing is deactivated for non-tonal portions, i.e., transient portions of the input signal. This makes sure that the full dynamic of reconstruction parameter changes is transmitted for transient sections of the audio signal, while this is not the case for tonal portions of the signal.

Preferably, the post processor performs a modification in the form of a smoothing of the reconstruction parameters, where this makes sense from a psycho-acoustic point of view, without affecting important spatial detection cues, which are of special importance for non-tonal, i.e., transient signal portions.

The present invention results in a low data rate, since an encoder-side quantization of reconstruction parameters can be a coarse quantization, since the system designer does not have to fear heavy changes in the decoder because of a change from a reconstruction parameter from one inversely quantized level to another inversely quantized level, which change is reduced by the inventive processing by mapping to a value between two requantization levels.

Another advantage of the present invention is that the quality of the system is improved, since audible artefacts caused by a change from one requantization level to the next allowed requantization level are reduced by the inventive post processing, which is operative to map to a value between two allowed requantization levels.

Naturally, the inventive post processing of quantized reconstruction parameters represents a further information loss, in addition to the information loss obtained by parametrization in the encoder and subsequent quantization of the reconstruction parameter. This is, however, not as bad as it sounds, since the inventive post processor preferably uses the actual or preceding quantized reconstruction parameters for determining a post processed reconstruction parameter to be used for reconstruction of the actual time portion of the input signal, i.e., the base channel. It has been shown that this results in an improved subjective quality, since encoder-induced errors can be compensated to a certain degree. Even when encoder-side induced errors are not compensated by the post processing of the reconstruction parameters, strong changes of the spatial perception in the reconstructed multi-channel audio signal are reduced, preferably only for tonal signal portions, so that the subjective listening quality is improved in any case, irrespective of the fact, whether this results in a further information loss or not.

BRIEF DESCRIPTION OF THE DRAWINGS

Preferred embodiments of the present invention are subsequently described by referring to the enclosed drawings, in which:

FIG. 1 shows a block diagram of an inventive multi-channel synthesizer for generating an output signal from an input signal. As will be shown later with reference to FIG. 4, the input signal has at least one input channel and a sequence of quantized reconstruction parameters, the quantized reconstruction parameters being quantized in accordance with a quantization rule. Each reconstruction parameter is associated with a time portion of the input channel so that a sequence of time portions has associated therewith a sequence of quantized reconstruction parameters. Additionally, it is to be noted that the output signal, which is generated by the multi-channel synthesizer of FIG. 1 has a number of synthesized output channels, which is in any case greater than the number of input channels in the input signal. When the number of input channels is 1, i.e., when there is a single input channel, the number of output channels will be 2 or more. When, however, the number of input channels is 2 or 3, the number of output channels will be at least 3 or at least 4.

In the BCC case described above, the number of input channels will be 1 or generally not more than 2, while the number of output channels will be 5 (left surround, left, center, right, right surround) or 6 (5 surround channels plus 1 sub-woofer channel) or even more in case of 7.1 or 9.1 multi-channel formats.

Figure 1:
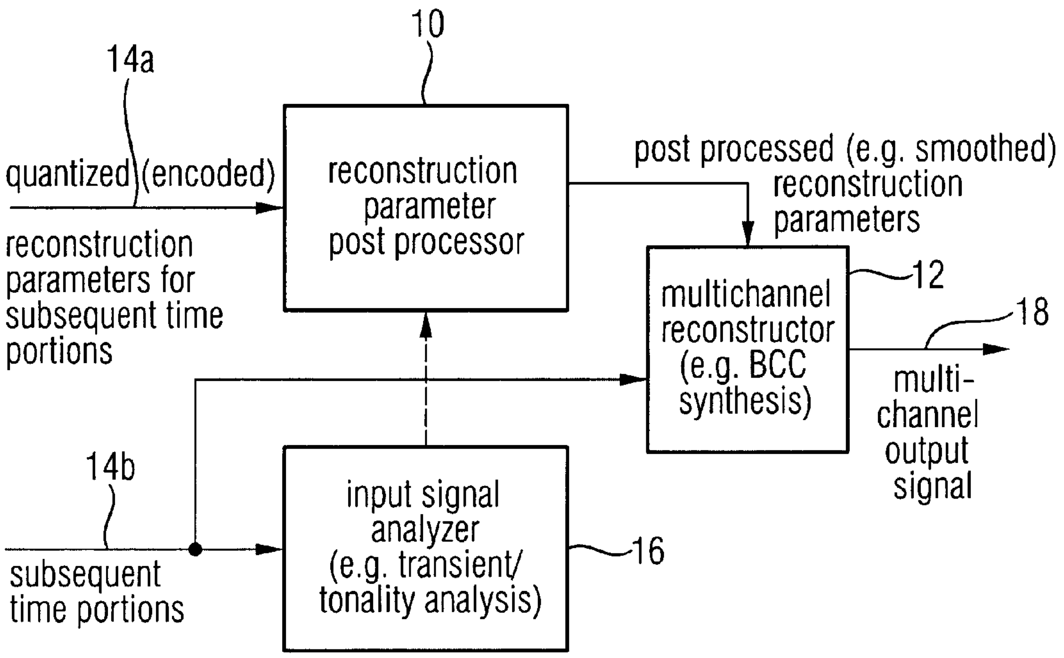
FIG. 1 is a block diagram of a preferred embodiment of the inventive multi-channel synthesizer.

As shown in FIG. 1, the inventive multi-channel synthesizer includes, as essential features, a reconstruction parameter post processor 10 and a multi-channel reconstructor 12. The reconstruction parameter post processor 10 is operative to receive quantized and preferably encoded reconstruction parameters for subsequent time portions of the input channel. The reconstruction parameter post processor 10 is operative to determine a post processed reconstruction parameter at an output thereof for a time portion to be processed of the input signal. The reconstruction parameter post processor operates in accordance to a post processing rule, which is in certain preferred embodiments a low pass filtering rule, a smoothing rule or something like that. In particular, the post processor 10 is operative to determine the post processed reconstruction parameter such that a value of the post processed reconstruction parameter is different from a value obtainable by requantization of any quantized reconstruction parameter in accordance with the quantization rule.

The multi-channel reconstructor 12 is used for reconstructing a time portion of each of the number of synthesis output channels using the time portion to be processed of the input channel and the post processed reconstruction parameter.

In preferred embodiments of the present invention, the quantized reconstruction parameters are quantized BCC parameters such as interchannel level differences, interchannel time differences or interchannel coherence parameters. Naturally, all other reconstruction parameters such as stereo parameters for intensity stereo or parametric stereo can be processed in accordance with the present invention as well.

To summarize, the inventive system has a first input 14*a* for the quantized and preferably encoded reconstruction parameters associated with subsequent time portions of the input signal. The subsequent time portions of the input signal are input into a second input 14*b*, which is connected to the multi-channel reconstructor 12 and preferably to an input signal analyser 16, which will be described later. On the output side, the inventive multi-channel synthesizer of FIG. 1 has a multi-channel output signal output 18, which includes several output channels, the number of which is larger than a number of input channels, wherein the number of input channels can be a single input channel or two or more input channels. In any case, there are more output channels than input channels, since the synthesized output channels are formed by use of the input signal on the one hand and the side information in the form of the reconstruction parameters on the other hand.

Figure 4:
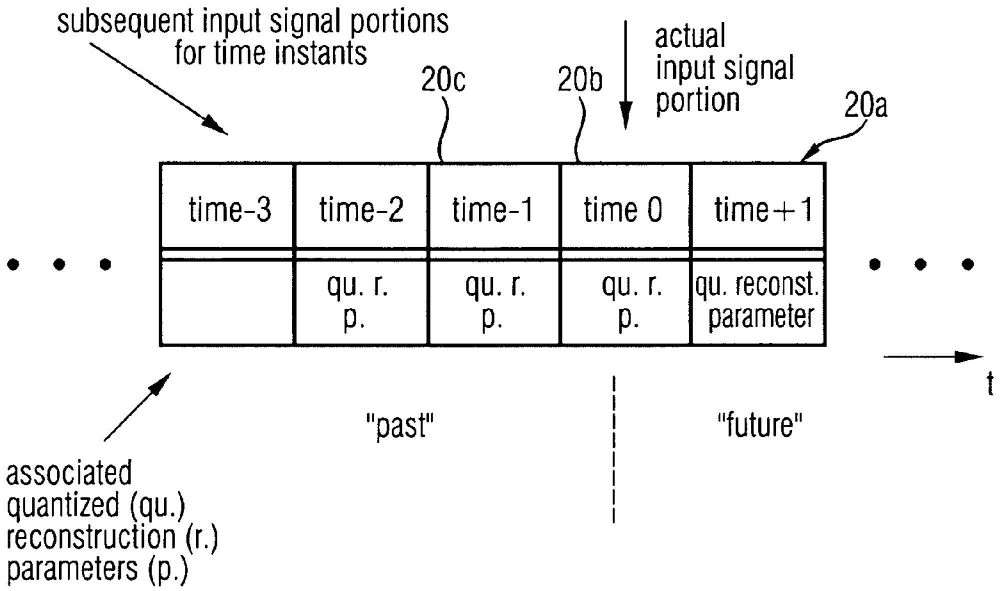
FIG. 4 is a schematic representation of time portions of the input signal and associated quantized reconstruction parameters for past signal portions, actual signal portions to be processed and future signal portions.

In the following, reference will be made to FIG. 4, which shows an example for a bit stream. The bit stream includes several frames 20*a*, 20*b*, 20*c*, . . . Each frame includes a time portion of the input signal indicated by the upper rectangle of a frame in FIG. 4. Additionally, each frame includes a set of quantized reconstruction parameters which are associated with the time portion, and which are illustrated in FIG. 4 by the lower rectangle of each frame 20*a*, 20*b*, 20*c*. Exemplarily, frame 20*b* is considered as the input signal portion to be processed, wherein this frame has preceding input signal portions, i.e., which form the "past" of the input signal portion to be processed. Additionally, there are following input signal portions, which form the "future" of the input signal portion to be processed (the input portion to be processed is also termed as the "actual" input signal portion), while input signal portions in the "past" are termed as former input signal portions, while signal portions in the future are termed as later input signal portions.

In the following, reference is made to FIG. 2 with respect to a complete encoder/decoder set-up, in which the inventive multi-channel synthesizer can be situated.

Figure 2:
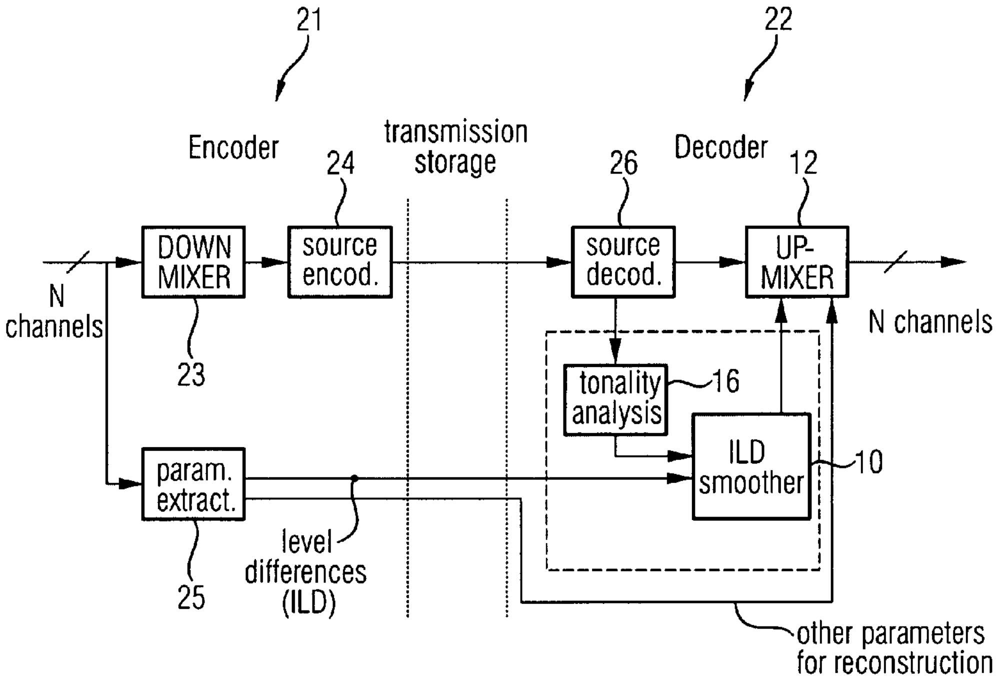
FIG. 2 is a block diagram of a preferred embodiment of an encoder/decoder system, in which the multi-channel synthesizer of FIG. 1 is included.
Figure 11:
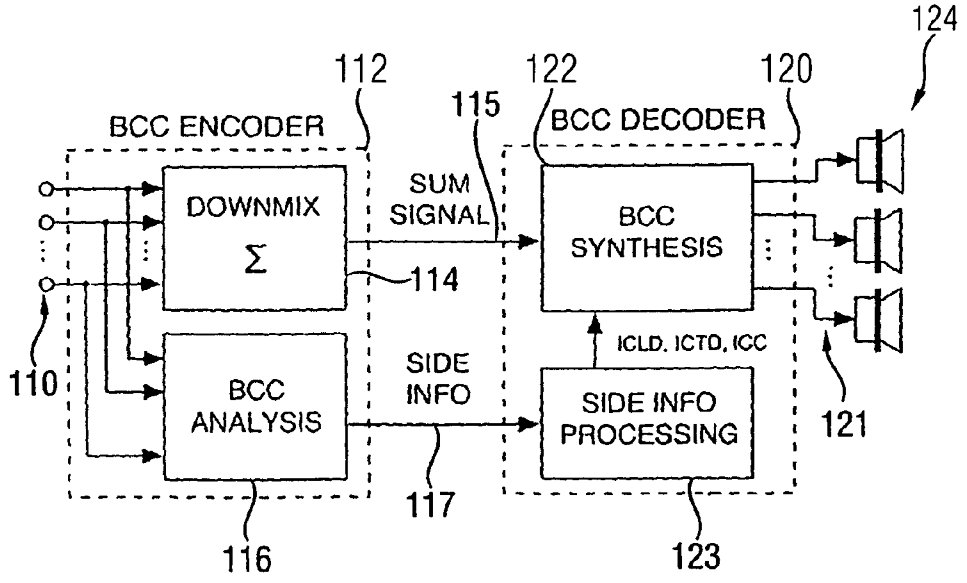
FIG. 11 (Prior Art)
FIG. 11 is a block diagram representation of a prior art BCC encoder/decoder chain.
Figure 12:
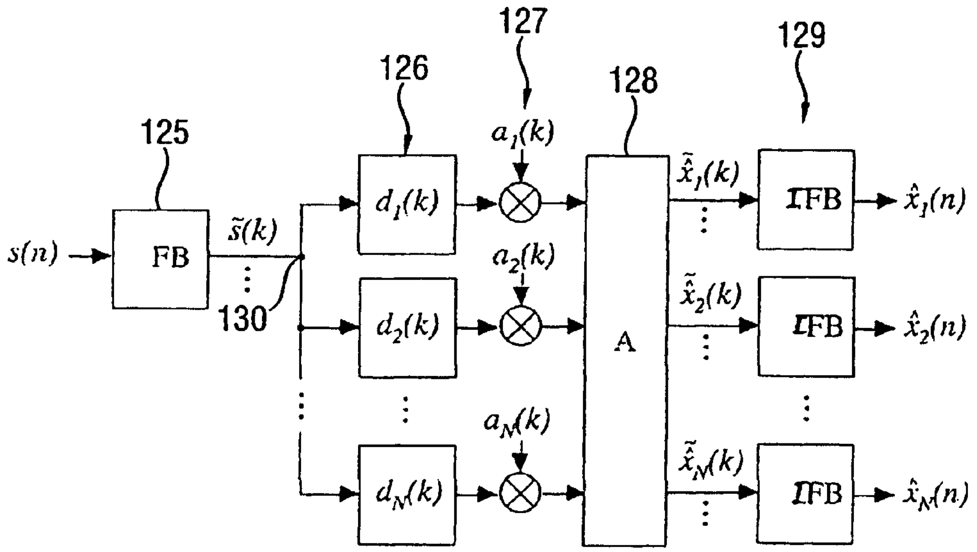
FIG. 12 (Prior Art)
FIG. 12 is a block diagram of a prior art implementation of a BCC synthesis block of FIG. 11.
Figure 13:
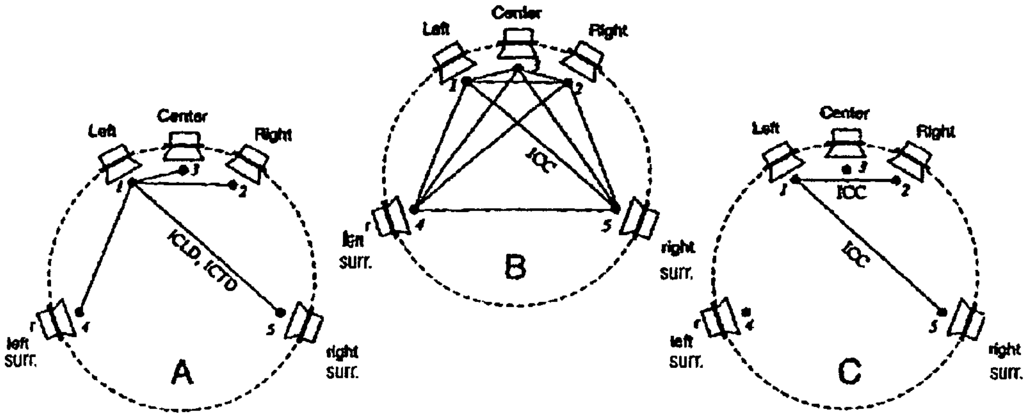
FIG. 13 (Prior Art)
FIG. 13 is a representation of a well-known scheme for determining ICLD, ICTD and ICC parameters.

FIG. 2 shows an encoder-side 21 and a decoder-side 22. In the encoder, N original input channels are input into a down mixer stage 23. The down mixer stage is operative to reduce the number of channels to e.g. a single mono-channel or, possibly, to two stereo channels. The down mixed signal representation at the output of down mixer 23 is, then, input into a source encoder 24, the source encoder being implemented for example as an mp3 decoder or as an AAC encoder producing an output bit stream. The encoder-side 21 further comprises a parameter extractor 25, which, in accordance with the present invention, performs the BCC analysis (block 116 in FIG. 11) and outputs the quantized and preferably Huffman-encoded interchannel level differences (ICLD). The bit stream at the output of the source encoder 24 as well as the quantized reconstruction parameters output by parameter extractor 25 can be transmitted to a decoder 22 or can be stored for later transmission to a decoder, etc.

The decoder 22 includes a source decoder 26, which is operative to reconstruct a signal from the received bit stream (originating from the source encoder 24). To this end, the source decoder 26 supplies, at its output, subsequent time portions of the input signal to an up-mixer 12, which performs the same functionality as the multi-channel reconstructor 12 in FIG. 1. Preferably, this functionality is a BCC synthesis as implemented by block 122 in FIG. 11. Contrary to FIG. 11, the inventive multi-channel synthesizer further comprises the post processor 10, which is termed as "interchannel level difference (ICLD) smoother", which is controlled by the input signal analyser 16, which preferably performs a tonality analysis of the input signal.

It can be seen from FIG. 2 that there are reconstruction parameters such as the interchannel level differences (ICLDs), which are input into the ICLD smoother, while there is an additional connection between the parameter extractor 25 and the up-mixer 12. Via this by-pass connection, other parameters for reconstruction, which do not have to be post processed can be supplied from the parameter extractor 25 to the up-mixer 12.

Figure 3:
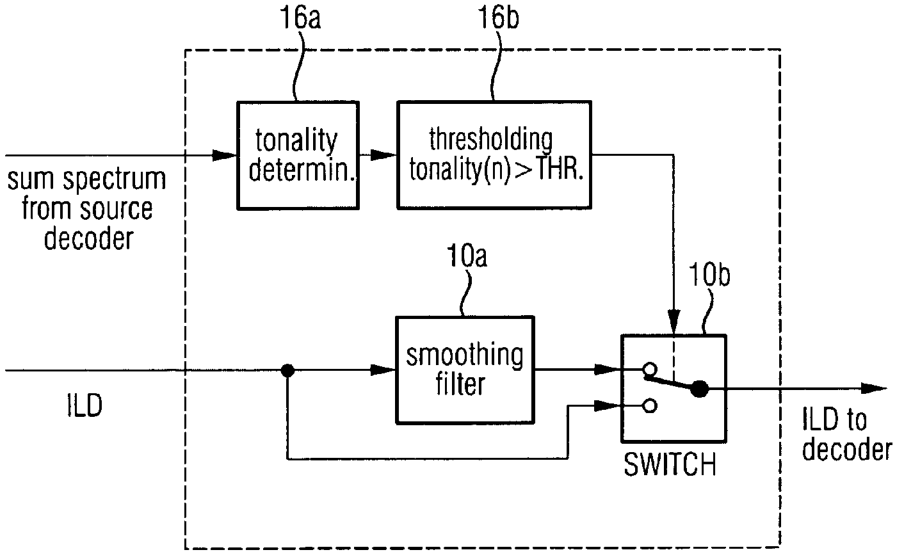
FIG. 3 is a block diagram of a post processor/signal analyser combination to be used in the inventive multi-channel synthesizer of FIG. 1.

FIG. 3 shows a preferred embodiment of the signal-adaptive reconstruction parameter processing formed by the signal analyser 16 and the ICLD smoother 10.

The signal analyser 16 is formed from a tonality determination unit 16*a* and a subsequent thresholding device 16*b*. Additionally, the reconstruction parameter post processor 10 from FIG. 2 includes a smoothing filter 10*a* and a post processor switch 10*b*. The post processor switch 10*b* is operative to be controlled by the thresholding device 16*b* so that the switch is actuated, when the thresholding device 16*b* determines that a certain signal characteristic of the input signal such as the tonality characteristic is in a predetermined relation to a certain specified threshold. In the present case, the situation is such that the switch is actuated to be in the upper position (as shown in FIG. 3), when the tonality of a signal portion of the input signal, and, in particular, a certain frequency band of a certain time portion of the input signal has a tonality above a tonality threshold. In this case, the switch 10*b* is actuated to connect the output of the smoothing filter 10*a* to the input of the multi-channel reconstructor 12 so that post processed, but not yet inversely quantized inter-channel differences are supplied to the decoder/multi-channel reconstructor/up-mixer 12.

When, however, the tonality determination means determines that a certain frequency band of a actual time portion of the input signal, i.e., a certain frequency band of an input signal portion to be processed has a tonality lower than the specified threshold, i.e., is transient, the switch is actuated such that the smoothing filter 10*a* is by-passed.

In the latter case, the signal-adaptive post processing by the smoothing filter 10*a* makes sure that the reconstruction parameter changes for transient signals pass the post processing stage unmodified and result in fast changes in the reconstructed output signal with respect to the spatial image, which corresponds to real situations with a high degree of probability for transient signals.

It is to be noted here that the FIG. 3 embodiment, i.e., activating post processing on the one hand and fully deactivating post processing on the other hand, i.e., a binary decision for post processing or not is only a preferred embodiment because of its simple and efficient structure. Nevertheless, it has to be noted that, in particular with respect to tonality, this signal characteristic is not only a qualitative parameter but also a quantative parameter, which can be normally between 0 and 1. In accordance with the quantitatively determined parameter, the smoothing degree of a smoothing filter or, for example, the cut-off frequency of a low pass filter can be set so that, for heavily tonal signals, a heavy smoothing is activated, while for signals which are not so tonal, the smoothing with a lower smoothing degree is initiated.

Naturally, one could also detect transient portions and exaggerate the changes in the parameters to values between predefined quantized values or quantization indices so that, for heavily transient signals, the post processing for the reconstruction parameters results in an even more exaggerated change of the spatial image of a multi-channel signal. In this case, a quantization step size of 1 as instructed by subsequent reconstruction parameters for subsequent time portions can be enhanced to for example 1.5, 1.4, 1.3 etc, which results in an even more dramatically changing spatial image of the reconstructed multi-channel signal.

It is to be noted here that a tonal signal characteristic, a transient signal characteristic or other signal characteristics are only examples for signal characteristics, based on which a signal analysis can be performed to control a reconstruction parameter post processor. In response to this control, the reconstruction parameter post processor determines a post processed reconstruction parameter having a value which is different from any values for quantization indices on the one hand or requantization values on the other hand as determined by a predetermined quantization rule.

It is to be noted here that post processing of reconstruction parameters dependent on a signal characteristic, i.e., a signal-adaptive parameter post processing is only optional. A signal-independent post processing also provides advantages for many signals. A certain post processing function could, for example, be selected by the user so that the user gets enhanced changes (in case of an exaggeration function) or damped changes (in case of a smoothing function). Alternatively, a post processing independent of any user selection and independent of signal characteristics can also provide certain advantages with respect to error resilience. It becomes clear that, especially in case of a large quantizer step size, a transmission error in a quantizer index may result in heavily audible artefacts. To this end, one would perform a forward error correction or anything like that, when the signal has to be transmitted over error-prone channels. In accordance with the present invention, the post processing can obviate the need for any bit-inefficient error correction codes, since the post processing of the reconstruction parameters based on reconstruction parameters in the past will result in a detection of erroneous transmitted quantized reconstruction parameters and will result in suitable counter measures against such errors. Additionally, when the post processing function is a smoothing function, quantized reconstruction parameters strongly differing from former or later reconstruction parameters will automatically be manipulated as will be outlined later.

Figure 5:
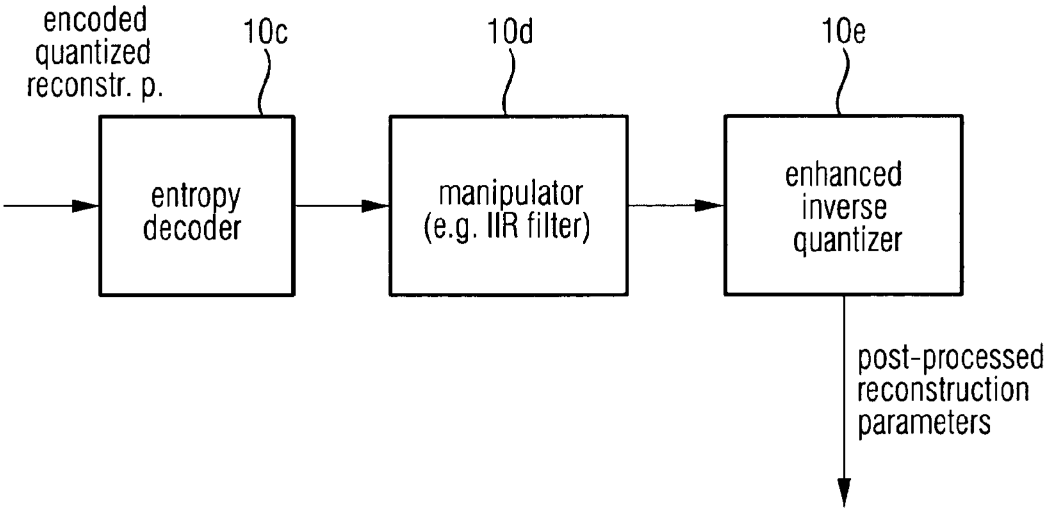
FIG. 5 is an embodiment of the post processor from FIG. 1.

FIG. 5 shows a preferred embodiment of the reconstruction parameter post processor 10 from FIG. 1. In particular, the situation is considered, in which the quantized reconstruction parameters are encoded. Here, the encoded quantized reconstruction parameters enter an entropy decoder 10*c*, which outputs the sequence of decoded quantized reconstruction parameters. The reconstruction parameters at the output of the entropy decoder are quantized, which means that they do not have a certain "useful" value but which means that they indicate certain quantizer indices or quantizer levels of a certain quantization rule implemented by a sub-sequent inverse quantizer. The manipulator 10*d* can be, for example, a digital filter such as an IIR (preferably) or a FIR filter having any filter characteristic determined by the required post processing function. A smoothing or low pass filtering post-processing function is preferred. At the output of the manipulator 10*d*, a sequence of manipulated quantized reconstruction parameters is obtained, which are not only integer numbers but which are any real numbers lying within the range-determined by the quantization rule. Such a manipulated quantized reconstruction parameter could have values of 1.1, 0.1, 0.5, . . . , compared to values 1, 0, 1 before stage 10*d*. The sequence of values at the output of block 10*d* are then input into an enhanced inverse quantizer 10*e* to obtain post-processed reconstruction parameters, which can be used for multi-channel reconstruction (e.g. BCC synthesis) in block 12 of FIG. 1.

It has to be noted that the enhanced quantizer 10*e* is different from a normal inverse quantizer since a normal inverse quantizer only maps each quantization input from a limited number of quantization indices into a specified inversely quantized output value. Normal inverse quantizers cannot map non-integer quantizer indices. The enhanced inverse quantizer 10*e* is therefore implemented to preferably use the same quantization rule such as a linear or logarithmic quantization law, but it can accept non-integer inputs to provide output values which are different from values obtainable by only using integer inputs.

Figure 6A:
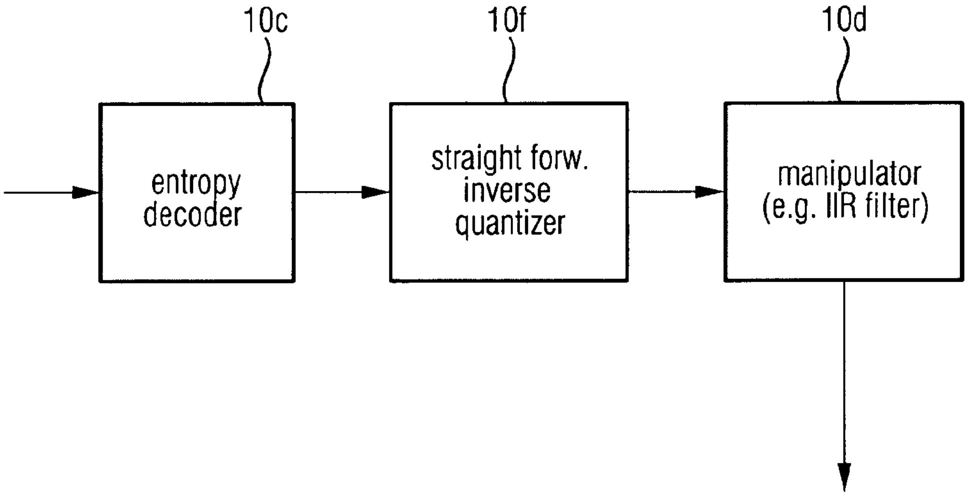
FIG. 6*a* is another embodiment of the post processor shown in FIG. 1.
Figure 6B:
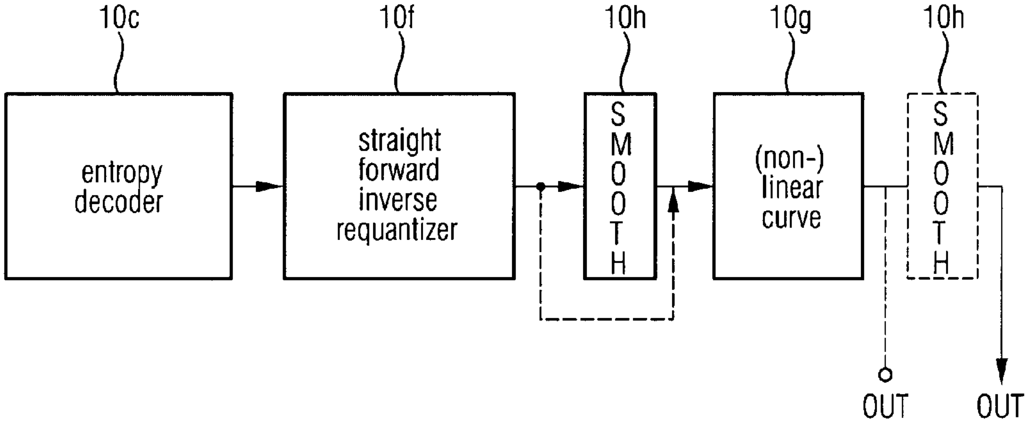
FIG. 6*b* is another preferred embodiment of the post processor.

With respect to the present invention, it basically makes no difference, whether the manipulation is performed before requantization (see FIG. 5) or after requantization (see FIG. 6*a*, FIG. 6*b*). In the latter case, the inverse quantizer only has to be a normal straightforward inverse quantizer, which is different from the enhanced inverse quantizer 10*e* of FIG. 5 as has been outlined above. Naturally, the selection between FIG. 5 and FIG. 6*a* will be a matter of choice depending on the certain implementation. For the present BCC implementation, the FIG. 5 embodiment is preferred, since it is more compatible with existing BCC algorithms. Nevertheless, this may be different for other applications.

FIG. 6*b* shows an embodiment in which the enhanced inverse quantizer 10*e* in FIG. 6*a* is replaced by a straightforward inverse quantizer and a mapper 10*g* for mapping in accordance with a linear or preferably non-linear curve. This mapper can be implemented in hardware or in software such as a circuit for performing a mathematical operation or as a look up table. Data manipulation using e.g. the smoother 10*g* can be performed before the mapper 10*g* or after the mapper 10*g* or at both places in combination. This embodiment is preferred, when the post processing is performed in the inverse quantizer domain, since all elements 10*f*, 10*h*, 10*g* can be implemented using straightforward components such as circuits of software routines.

Figure 7A:
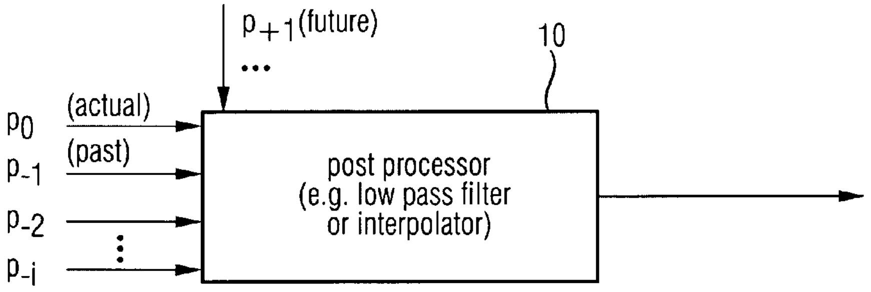
FIG. 7*a* is another embodiment of the post processor shown in FIG. 1.
Figure 7B:
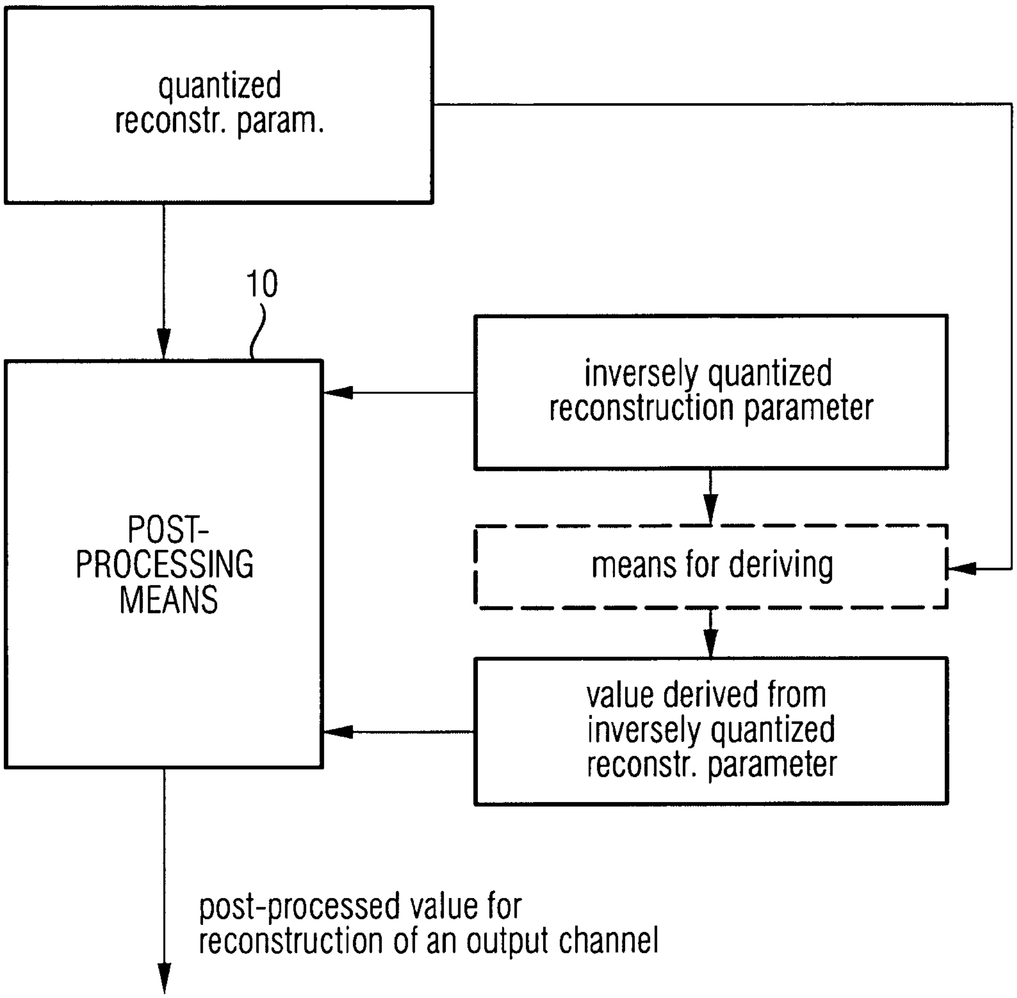
FIG. 7*b* is a schematic indication of the parameters to be post processed in accordance with the invention showing that also a quantity derived from the reconstruction parameter can be smoothed.

Generally, the post processor 10 is implemented as a post processor as indicated in FIG. 7*a*, which receives all or a selection of actual quantized reconstruction parameters, future reconstruction parameters or past quantized reconstruction parameters. In the case, in which the post processor only receives at least one past reconstruction parameter and the actual reconstruction parameter, the post processor will act as a low pass filter. When the post processor 10, however, receives a future quantized reconstruction parameter, which is not possible in real-time applications, but which is possible in all other applications, the post processor can perform an interpolation between the future and the present or a past quantized reconstruction parameter to for example smooth a time-course of a reconstruction parameter, for example for a certain frequency band.

As has been outlined above, the data manipulation to overcome artefacts due to quantization step sizes in a coarse quantization environment can also be performed on a quantity derived from the reconstruction parameter attached to the base channel in the parametrically encoded multi channel signal. When for example the quantized reconstruction parameter is a difference parameter (ICLD), this parameter can be inversely quantized without any modification. Then an absolute level value for an output channel can be derived and the inventive data manipulation is performed on the absolute value. This procedure also results in the inventive artefact reduction, as long as a data manipulation in the processing path between the quantized reconstruction parameter and the actual reconstruction is performed so that a value of the post processed reconstruction parameter or the post processed quantity is different from a value obtainable using requantization in accordance with the quantization rule, i.e. without manipulation to overcome the "step size limitation".

Many mapping functions for deriving the eventually manipulated quantity from the quantized reconstruction parameter are devisable and used in the art, wherein these mapping functions include functions for uniquely mapping an input value to an output value in accordance with a mapping rule to obtain a non post processed quantity, which is then post processed to obtain the postprocessed quantity used in the multi channel reconstruction (synthesis) algorithm.

Figure 8:
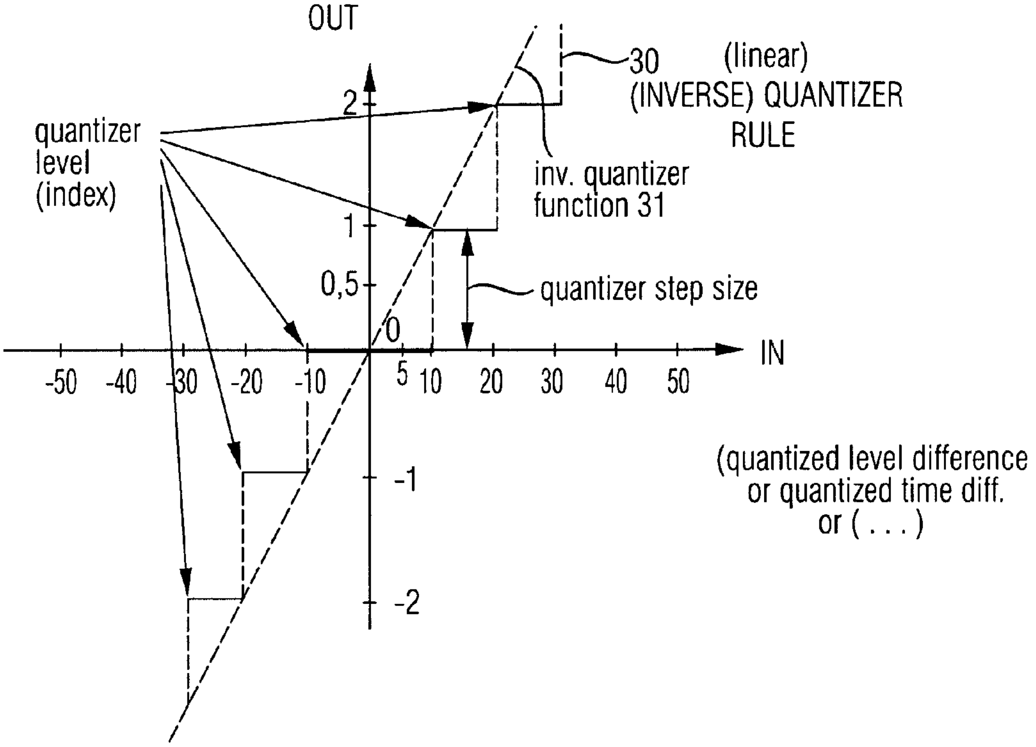
FIG. 8 is a schematic representation of a quantizer/inverse quantizer performing a straight-forward mapping or an enhanced mapping.

In the following, reference is made to FIG. 8 to illustrate differences between an enhanced inverse quantizer 10*e* of FIG. 5 and a straightforward inverse quantizer 10*f* in FIG. 6*a*. To this end, the illustration in FIG. 8 shows, as a horizontal axis, an input value axis for non-quantized values. The vertical axis illustrates the quantizer levels or quantizer indices, which are preferably integers having a value of 0, 1, 2, 3. It has to be noted here that the quantizer in FIG. 8 will not result in any values between 0 and 1 or 1 and 2. Mapping to these quantizer levels is controlled by the stair-shaped function so that values between −10 and 10 for example are mapped to 0, while values between 10 and 20 are quantized to 1, etc.

A possible inverse quantizer function is to map a quantizer level of 0 to an inversely quantized value of 0. A quantizer level of 1 would be mapped to an inversely quantized value of 10. Analogously, a quantizer level of 2 would be mapped to an inversely quantized value of 20 for example. Requantization is, therefore, controlled by an inverse quantizer function indicated by reference number 31. It is to be noted that, for a straightforward inverse quantizer, only the crossing points of line 30 and line 31 are possible. This means that, for a straightforward inverse quantizer having an inverse quantizer rule of FIG. 8 only values of 0, 10, 20, 30 can be obtained by requantization.

This is different in the enhanced inverse quantizer 10*e*, since the enhanced inverse quantizer receives, as an input, values between 0 and 1 or 1 and 2 such as value 0.5. The advanced requantization of value 0.5 obtained by the manipulator 10*d* will result in an inversely quantized output value of 5, i.e., in a post processed reconstruction parameter which has a value which is different from a value obtainable by requantization in accordance with the quantization rule. While the normal quantization rule only allows values of 0 or 10, the inventive inverse quantizer working in accordance with the inverse quantizer function 31 results in a different value, i.e., the value of 5 as indicated in FIG. 8.

While the straight-forward inverse quantizer maps integer quantizer levels to quantized levels only, the enhanced inverse quantizer receives non-integer quantizer "levels" to map these values to "inversely quantized values" between the values determined by the inverse quantizer rule.

Figure 9A:
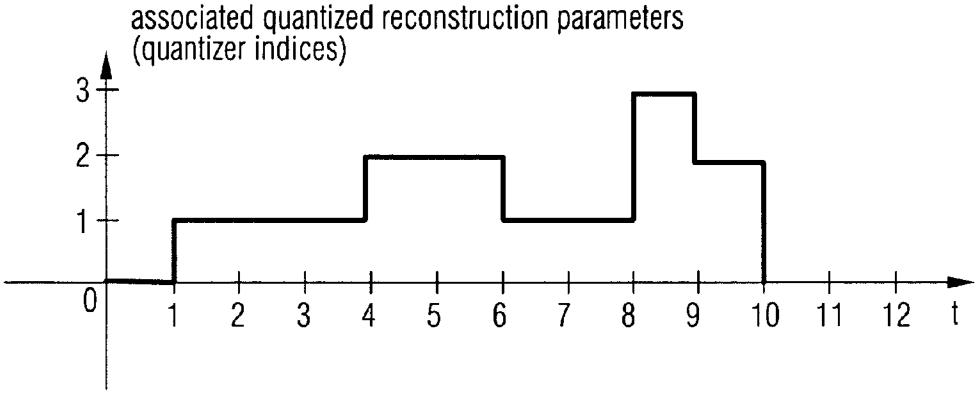
FIG. 9*a* is an exemplary time course of quantized reconstruction parameters associated with subsequent input signal portions.
Figure 9B:
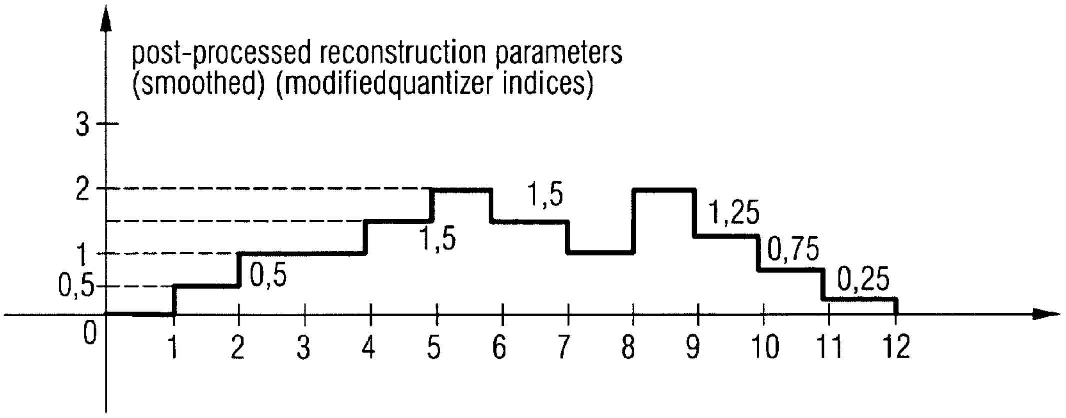
FIG. 9*b* is a time course of post processed reconstruction parameters, which have been post-processed by the post processor implementing a smoothing (low-pass) function.
Figure 10:
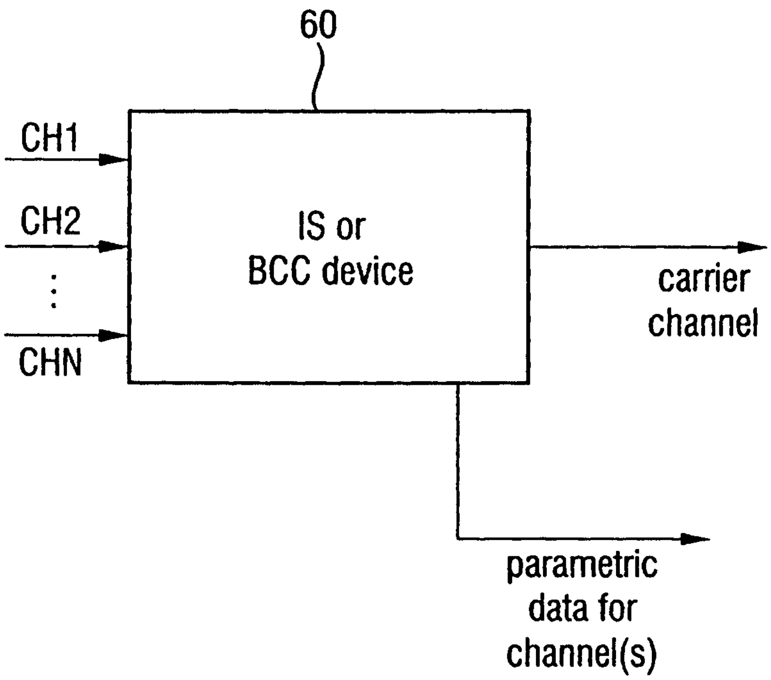
FIG. 10 (Prior Art)
FIG. 10 illustrates a prior art joint stereo encoder.

FIG. 9 shows the impact of the inventive post processing for the FIG. 5 embodiment. FIG. 9*a* shows a sequence of quantized reconstruction parameters varying between 0 and 3. FIG. 9*b* shows a sequence of post processed reconstruction parameters, which are also termed as "modified quantizer indices", when the wave form in FIG. 9*a* is input into a low pass (smoothing) filter. It is to be noted here that the increases/decreases at time instance 1, 4, 6, 8, 9, and 10 are reduced in the FIG. 9*b* embodiment. It is to be noted with emphasis that the peak between time instant 8 and time instant 9, which might be an artefact is damped by a whole quantization step. The damping of such extreme values can, however, be controlled by a degree of post processing in accordance with a quantitative tonality value as has been outlined above.

The present invention is advantageous in that the inventive post processing smoothes fluctuations or smoothes short extreme values. The situation especially arises in a case, in which signal portions from several input channels having a similar energy are super-positioned in a frequency band of a signal, i.e., the base channel or input signal channel. This frequency band is then, per time portion and depending on the instant situation mixed to the respective output channels in a highly fluctuating manner. From the psycho-acoustic point of view, it would, however, be better to smooth these fluctuations, since these fluctuations do not contribute substantially to a detection of a location of a source but affect the subjective listening impression in a negative manner.

In accordance with a preferred embodiment of the present invention, such audible artefacts are reduced or even eliminated without incurring any quality losses at a different place in the system or without requiring a higher resolution/quantization (and, thus, a higher data rate) of the transmitted reconstruction parameters. The present invention reaches this object by performing a signal-adaptive modification (smoothing) of the parameters without substantially influencing important spatial localization detection cues.

The sudden occurring changes in the characteristic of the reconstructed output signal result in audible artefacts in particular for audio signals having a highly constant stationary characteristic. This is the case with tonal signals. Therefore, it is important to provide a "smoother" transition between quantized reconstruction parameters for such signals. This can be obtained for example by smoothing, interpolation, etc.

Additionally, such a parameter value modification can introduce audible distortions for other audio signal types. This is the case for signals, which include fast fluctuations in their characteristic. Such a characteristic can be found in the transient part or attack of a percussive instrument. In this case, the present invention provides for a deactivation of parameter smoothing.

This is obtained by post processing the transmitted quantized reconstruction parameters in a signal-adaptive way.

The adaptivity can be linear or non-linear. When the adaptivity is non-linear, a thresholding procedure as described in FIG. 3 is performed.

Another criterion for controlling the adaptivity is a determination of the stationarity of a signal characteristic. A certain form for determining the stationarity of a signal characteristic is the evaluation of the signal envelope or, in particular, the tonality of the signal. It is to be noted here that the tonality can be determined for the whole frequency range or, preferably, individually for different frequency bands of an audio signal.

The present invention results in a reduction or even elimination of artefacts, which were, up to now, unavoidable, without incurring an increase of the required data rate for transmitting the parameter values.

As has been outlined above with respect to FIGS. 2 and 3, the preferred embodiment of the present invention performs a smoothing of interchannel level differences, when the signal portion under consideration has a tonal characteristic. Interchannel level differences, which are calculated in an encoder and quantized in an encoder are sent to a decoder for experiencing a signal-adaptive smoothing operation. The adaptive component is a tonality determination in connection with a threshold determination, which switches on the filtering of interchannel level differences for tonal spectral components, and which switches off such post processing for noise-like and transient spectral components. In this embodiment, no additional side information of an encoder are required for performing adaptive smoothing algorithms.

It is to be noted here that the inventive post processing can also be used for other concepts of parametric encoding of multi-channel signals such as for parametric stereo MP3/AAC, MP3 surround, and similar methods.

What is claimed is:

1. Multi-channel synthesizer for generating an output signal from an input signal, the input signal having at least one input channel and a sequence of quantized reconstruction parameters, the quantized reconstruction parameters being quantized in accordance with a quantization rule, and being associated with subsequent time portions of the input channel, the output signal having a number of synthesized output channels, and the number of synthesized output channels being greater than 1 or greater than a number of input channels, comprising:

an input signal analyser for analysing the input signal to determine a signal characteristic of a time portion of the input signal to be processed;

a post processor for determining a post processed reconstruction parameter or a post processed quantity derived from the reconstruction parameter depending on the signal characteristic determined by the input signal analyzer for the time portion of the input signal to be processed, wherein the post processor is operative to determine the post processed reconstruction parameter or the post processed quantity such that a value of the post processed reconstruction parameter or the post processed quantity is different from a value obtainable using requantization in accordance with the quantization rule, wherein the post processor is operative to perform a smoothing function before or after requantization so that a sequence of post processed reconstruction parameters is smoother in time compared to a sequence of non-post-processed inversely quantized reconstruction parameters; and a multi-channel reconstructor for reconstructing a time portion of the number of synthesized output channels using the time portion of the input channel and the post processed reconstruction parameter or the post processed value.

2. Multi-channel synthesizer in accordance with claim 1, in which the post processor is operative to determine the post processed reconstruction parameter, when a predetermined signal characteristic is determined by the input signal analyser, and to bypass the post processor, when the predetermined signal characteristic is not determined by the input signal analyser for a time portion of the input signal.

3. Multi-channel synthesizer in accordance with claim 2, in which the input signal analyzer is operative to determine the signal characteristic as the predetermined signal characteristic, when a signal characteristic value is in a specified relation to a threshold.

4. Multi-channel synthesizer in accordance with claim 1, in which the signal characteristic is a tonality characteristic or a transient characteristic of the portion of the input signal to be processed.

5. Multi-channel synthesizer in accordance with claim 1, in which the post processor includes a digital filter having a low pass characteristic, the filter receiving as an input at least one reconstruction parameter associated with a preceding time portion of the input signal.

6. Multi-channel synthesizer in accordance with claim 1, in which the post processor is operative to perform an interpolating function using a reconstruction parameter associated with at least one preceding time portion or using a reconstruction parameter associated with at least one subsequent time portion.

7. Multi-channel synthesizer in accordance with claim 1, in which the post processor is operative to determine a manipulated reconstruction parameter as not being coincident with any quantization level defined by the quantization rule, and to inversely quantize the manipulated reconstruction parameter using a inverse quantizer being operable to map the manipulated reconstruction parameter to an inversely quantized manipulated reconstruction parameter not being coincident with an inversely quantized value defined by mapping any quantization level by the inverse quantizer.

8. Multi-channel synthesizer in accordance with claim 7, in which the quantization rule is a logarithmic quantization rule.

9. Multi-channel synthesizer in accordance with claim 1, in which the postprocessor is operative to inversely quantize quantized reconstruction parameters in accordance with the quantization rule, to manipulate obtained inversely quantized reconstruction parameters, and to map manipulated parameters in accordance with a non-linear or linear function.

10. Multi-channel synthesizer in accordance with claim 1, in which the postprocessor is operative to inversely quantize quantized reconstruction parameters in accordance with the quantization rule, to map obtained inversely quantized parameters in accordance with a non-linear or linear function; and to manipulate obtained mapped reconstruction parameters.

11. Multi-channel synthesizer in accordance with claim 1, in which the post processor is operative to an inversely quantized reconstruction parameter associated with the subsequent time portion of the input signal in accordance with the quantization rule, and in which the post processor is further operative to determine a post processed reconstruction parameter based on at least one inversely quantized reconstruction parameter for at least one preceding time portion of the input signal.

12. Multi-channel synthesizer in accordance with claim 1, in which a time portion of the input signal has associated therewith a plurality of quantized reconstruction parameters for different frequency bands of the input signal, and in which the post processor is operative to determine post processed reconstruction parameters for the different frequency bands of the input signal.

13. Multi-channel synthesizer in accordance with claim 1, in which the input signal is a sum spectrum obtained by combining at least two original channels of a multi-channel audio signal, and in which the quantized reconstruction parameter is an inter-channel level difference parameter, an interchannel time difference parameter, an interchannel phase difference parameter or an interchannel coherence parameter.

14. Multi-channel synthesizer in accordance with claim 1, in which the input channel analyser is operative to determine a degree quantitatively indicating how much the input signal has the signal characteristic, and in which the post processor is operative to perform a post processing with a strength depending on the degree.

15. Multi-channel synthesizer in accordance with claim 1, in which the post processor is operative to use the quantized reconstruction parameter associated with the time portion to be processed, when determining the post processed reconstruction parameter for the time portion to be processed.

16. Multi-channel synthesizer in accordance with claim 1, in which the quantization rule is such that a difference between two adjacent quantization levels is larger than a difference between two numbers determined by a processor accuracy of a processor for performing numerical calculations.

17. Multi-channel synthesizer in accordance with claim 1, in which the quantized reconstruction parameters are entropy encoded and associated with the time portion in an entropy encoded form, and in which the post processor is operative to entropy-decode the entropy-encoded quantized reconstruction parameter used for determining the post processed reconstruction parameters.

18. Multi-channel synthesizer in accordance with claim 5, in which the digital filter is an IIR filter.

19. Multi-channel synthesizer in accordance with claim 1, in which the post processor is operative to implement a post processing rule such that a difference between post processed reconstruction parameters for subsequent time portions is smaller than a difference between non-post processed reconstruction parameters derived from the quantized reconstruction parameters associated with subsequent time portions by requantization.

20. Multi-channel synthesizer in accordance with claim 1, in which the postprocessed quantity is derived from the quantized reconstruction parameter only using a mapping function uniquely mapping an input value to an output value in accordance with a mapping rule to obtain a non post processed quantity, and in which the post processor is operative to post process the non postprocessed quantity to obtain the postprocessed quantity.

21. Multi-channel synthesizer in accordance with claim 1, in which the quantized reconstruction parameter is a difference parameter indicating a parameterised difference between two absolute quantities associated with the input channels, and in which the post processed quantity is an absolute value used for reconstructing an output channel corresponding to one of the input channels.

22. Multi-channel synthesizer in accordance with claim 17, in which the quantized reconstruction parameter is an inter channel level difference, and in which the post processed quantity indicates an absolute level of an output channel, or in which the quantized reconstruction parameter is an inter channel time difference, and in which the post processed quantity indicates an absolute time reference of an output channel, or in which the quantized reconstruction parameter is an inter channel coherence measure, and in which the post processed quantity indicates an absolute coherence level of an output channel, or in which the quantized reconstruction parameter is an inter channel phase difference, and in which the post processed quantity indicates an absolute phase value of an output channel.

23. Method of generating an audio output signal from an audio input signal, the audio input signal having at least one audio input channel and a sequence of quantized reconstruction parameters, the quantized reconstruction parameters being quantized in accordance with a quantization rule, and being associated with subsequent time portions of the audio input channel, the audio output signal having a number of synthesized audio output channels, and the number of synthesized audio output channels being greater than 1 or greater than a number of audio input channels, comprising:

analysing the input signal to determine a signal characteristic of a time portion of the input signal to be processed determining a post processed reconstruction parameter or a post processed quantity derived from the reconstruction parameter depending on the signal characteristic determined by the analyzing for the time portion of the audio input signal to be processed, such that a value of the post processed reconstruction parameter or the post processed quantity is different from a value obtainable using requantization in accordance with the quantization rule, wherein the step of determining comprises a smoothing function before or after requantization so that a sequence of post processed reconstruction parameters is smoother in time compared to a sequence of non-post-processed inversely quantized reconstruction parameters; and reconstructing a time portion of the number of synthesized audio output channels using the time portion of the audio input channel and the post processed reconstruction parameter or the post processed value.

* * * * *

UNITED STATES PATENT AND TRADEMARK OFFICE

CERTIFICATE OF CORRECTION

PATENT NO. : 8,843,378 B2
APPLICATION NO. : 10/883538
DATED : September 23, 2014
INVENTOR(S) : Juergen Herre et al.

It is certified that error appears in the above-identified patent and that said Letters Patent is hereby corrected as shown below:

On the Title Page

Item (73) Assignee:

Fraunhofer-Gesellschaft zur Foerderung der Angewandten Forschung E.V.

should be:

Fraunhofer-Gesellschaft zur Foerderung der angewandten Forschung e.V.

Signed and Sealed this
Thirtieth Day of June, 2015

Michelle K. Lee
*Director of the United States Patent and Trademark Office*